United States Patent [19]

Fisher

[11] 4,058,040

[45] Nov. 15, 1977

[54] SLOTTED WORKTABLE

[75] Inventor: Martin John Fisher, Milton Keynes, England

[73] Assignee: The British Hydromechanics Research Association, England

[21] Appl. No.: 674,444

[22] Filed: Apr. 7, 1976

[30] Foreign Application Priority Data

Apr. 9, 1975 United Kingdom ............... 14619/75

[51] Int. Cl.² .............................................. B26F 3/00
[52] U.S. Cl. .................................................... 83/177
[58] Field of Search .................. 83/177; 108/102, 137; 160/122

[56] References Cited

FOREIGN PATENT DOCUMENTS 1,287,585  9/1976  United Kingdom ................... 83/177

Primary Examiner—Willie G. Abercrombie
Attorney, Agent, or Firm—Leydig, Voit, Osann, Mayer & Holt, Ltd.

[57] ABSTRACT

A slotted worktable for a cutting machine for a high pressure fluid jet cutting device has a first frame mounted on a second frame for relative movement therewith, there being a support surface formed by two portions of a flexible support material which are trained round spaced apart horizontal rollers defining a slot. As the frames moves relative to one another, the slot moves and a cutting head on a guide over the slots moves therewith so that it is always aligned therewith.

13 Claims, 4 Drawing Figures

SLOTTED WORKTABLE

The invention relates to a slotted worktable which is particularly, although not exclusively, suitable for use in cutting apparatus in which a workpiece to be cut is mounted on the worktable.

In cutting apparatus such as profile cutters in which piercing means such as oxy-acetylene cutting torch are used to cut rigid sheet material, it is only necessary to support the sheet material at a position within the final external periphery of the workpiece. However, for cutting less rigid sheets of material by any means, but in particular by fluid cutting means such as a high pressure liquid jet, it is necessary to support the sheet material at or adjacent the final periphery of the cut material. Moreover, as the cutting of such sheet material is most effectively performed when the sheet material is held stationary and the cutting means are moved along the required final periphery, it has not been possible to align a support surface with the cutting means and to move the sheet material relative to the cutting means over this fixed support.

One solution which has been adopted is to provide a worktable in the form of a grid which supports the entire workpiece to be cut. However, the members of such a grid interfere with the cutting action of the cutting means and can only be used where the grid material is not seriously damaged by the cutting means. This problem is of particular importance where cutting is effected by means of a high pressure liquid jet or by means of a flame cutting torch.

It has also been proposed to support a workpiece on a table formed by two separately driven belts having a slot inbetween them as taught in British Pat. No. 1,287,585 which was published Aug. 31, 1972. One problem with the latter construction is that it is impossible, as a practical matter, to drive the two belts at precisely the same speed and through identical displacements. Where a rigid workpiece is supported jointly on two separate belts the speed of the workpiece under the tool may vary depending upon which belt provides the dominant support. In the case of a flexible workpiece momentary differences in belt velocity will have the effect of either stretching the workpiece, with resultant slippage, or causing it to "hump up" at the clearance slot. A further problem with the use of two movable belts forming a worktable is that unless the total belt length is excessively long, movement of the belts tends to move a workpiece into an overhanging position which results in undesirable cantilevering in the case of rigid workpieces and failure of edge support in the case of workpieces formed of flexible material.

It is therefore an object of the present invention to provide a worktable having a slot which is movable from one side of the table to the other without lateral movement of the table surface relative to a body supported on the worktable.

According to the invention, there is provided a slotted worktable comprising a single piece support material in the form of a belt having two portions extending respectively from horizontal edges of a first frame to laterally spaced first and second parallel rollers mounted on horizontal axes disposed between the edges and defining a slot, and a second frame supporting the rollers for horizontal movement between opposite sides of the first frame. The belt is trained over the first and second rollers to define a depending loop.

Preferably the two portions of flexible material are integral with an intermediate portion which is arranged on opposite sides of a vertical plane passing between the two laterally spaced rollers and passed below at least one further parallel roller mounted on a horizontal axis disposed below the two laterally spaced rollers. Where there are two such further rollers, these may be laterally spaced by a greater amount than the two laterally spaced rollers defining the edges of the slot.

The flexible support material may be a flexible sheet material.

Conveniently, the opposite ends of the rollers are mounted in opposite ends of the second frame and the second frame is movable along at least one laterally extending guide. To facilitate movement along the, or each, laterally extending guide, the second frame may be provided with roller means. Fastening means for a workpiece to be cut may be provided. The fastening means may comprise a high friction surface on the support face of the sheet material. Alternatively, the fastening means may comprise suction clamps provided adjacent the anchored edges of the two lengths of flexible sheet material.

With a slotted workpiece as hereinbefore described, it is possible to provide guide means in which a guide for cutting means extends between the opposite ends of the second frame above the two laterally spaced rollers defining the edges of the slot, and the guide means may comprise a bar or a member formed with an elongate slot.

Cutting apparatus incorporating such guide means may include cutting means mounted for relative movement along the guide extending between the opposite ends of the second frame and the cutting means may comprise high pressure fluid jet cutting means. Where the cutting means comprise high pressure liquid jet cutting means, a receptacle for the liquid may depend from between the two laterally spaced rollers defining the edges of the slot.

The cutting means may be constructed so as to be moveable along the guide or held stationary so that relative movement along the guide is effected by movement of the first frame along an axis extending parallel in the axes of the two laterally spaced rollers defining the edges of the slot.

Removal of a cut workpiece remote from the cutting means may be achieved by indexing forward the cut sections for the support surface onto a conventional conveyor system. Driver, driven and guide rollers round which the flexible support material can pass in a continuous length, form part of the first frame. Upper guide rollers may be firmly clamped after each indexing cycle so that the support material will be held taut for a subsequent cutting operation.

Cutting apparatus incorporating a slotted worktable according to the present invention is hereinafter described, by way of example, with reference to the accompanying drawings, in which.

In the following description like parts are indicated by like reference numerals.

Figure 1:
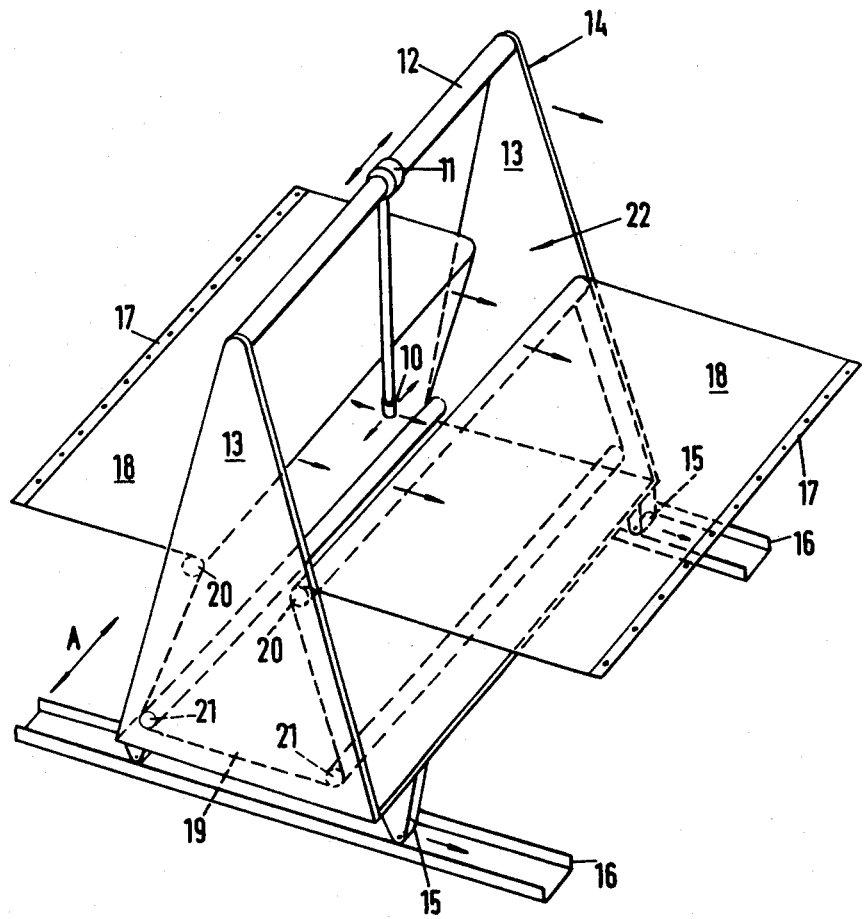
FIG. 1 is a perspective view of the cutting apparatus.
Figure 2:
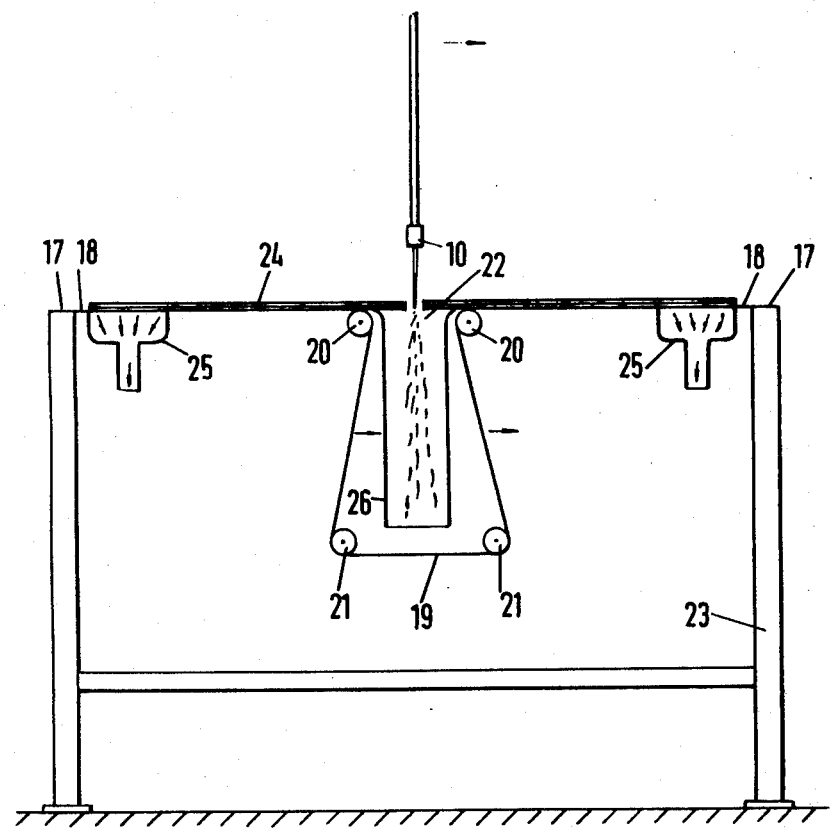
FIG. 2 is a sectional side elevation of part of the cutting apparatus shown in FIG. 1.

As shown in FIG. 1, a high pressure water jet cutting head 10 is carried by a sleeve 11 which is moveable along a bar 12 extending between opposite ends 13 of a moveable frame 14 which is mounted on rollers 15 for movement along two laterally extending guide rails 16 between opposite sides of a fixed frame 23, shown in FIG. 2.

The edges 17 of the end portions 18 of a flexible support material in the form of a piece of flexible sheet material 19 are anchored, in tension, to the opposite sides of the fixed frame and the portions 18 are trained over two laterally spaced parallel rollers 20 which are supported at opposite ends by the ends 13 of the moveable frame 14 for rotation about horizontal axes disposed between the anchored edges 17. The intermediate portion of the flexible sheet material is arranged symmetrically on opposite sides of a vertical plane passing between the laterally spaced rollers 20 and passed below two further parallel rollers 21 which are also mounted at opposite ends on the ends 13 of the moveable frame 14 for rotation about horizontal axes and are laterally spaced by a greater amount than the two laterally spaced rollers 20 so that the depending loop is of trapezoidal cross section. The two portions 18 of the flexible sheet material 19 thus provide two portions of a worktable surface which are separated by a slot 22 through which a cutting jet of high pressure water may be directed.

As shown in FIG. 2, the edges 17 of the end portions 18 of the flexible sheet material 19 are attached to the opposite sides of the fixed first frame 23 so as to support a workpiece 24. Suction clamps 25 or other clamping means are provided at regions of the portions 18 adjacent the anchored edges 17 and connected to suction means (not shown) so as to secure the workpiece 24 to the worktable surface.

Thus, when the moveable second frame 14 is moved from left to right, as shown in FIG. 2, the portion 18 of flexible material on the left of the slot 22 increases while the portion 18 on the right of the slot 22 decreases without relative lateral movement between the workpiece 24 and the flexible sheet material 19. The cutting jet carried by the second frame 14 is therefore automatically maintained above the slot 22 and liquid from the cutting jet may be collected in a receptacle 26 supported by the ends 13 of the second frame 14.

Figure 3:
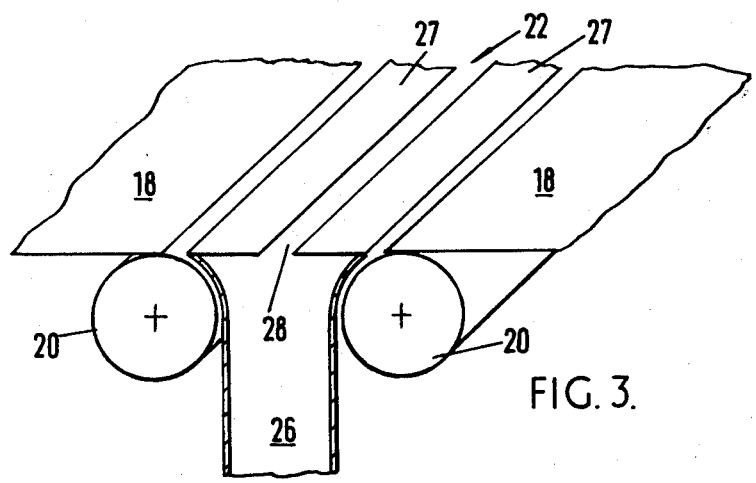
FIG. 3 is a perspective view of part of the apparatus shown in FIG. 2.

As shown in FIG. 3, the receptable 26 is of generally "U"-shaped cross-section which flares laterally at its upper end and is provided with inwardly directed flanges 27 which provide further support surfaces for the workpiece 24 and define a slot 28 for the water from the cutting jet 10.

Figure 4:
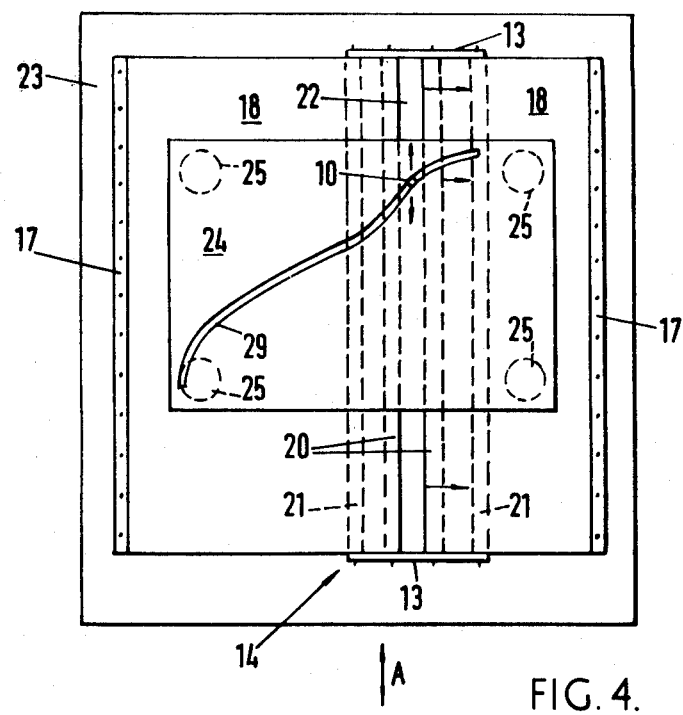
FIG. 4 is a sectional plan view of the cutting apparatus shown in FIG. 1.

In order to cut a slot 29 in a workpiece 24, as shown in FIG. 4, it is necessary to move the second frame 14 from left to right from one side of the first frame 23 to the other. During this movement of the frame 14, the cutting jet 10 and the vertically aligned slot 22 are also moved from left to right and so, in order to cut along the right path, it is necessary to move the sleeve 11 carrying the cutting jet 10 along the bar 12, as shown in FIG. 1. Clearly, if the sleeve 11 is held stationary, relative movement between the sleeve 11 and the bar 12 may be effected by moving the frame 23 in the direction of Arrow A in FIGS. 1 and 4.

It will be understood that in the preferred embodiment the receptacle 26 allows the collection and drainage of the cutting liquid and also receives cut material which can be flushed out as the liquid is drained. The receptacle also helps to suppress noise emanating from the high speed liquid, which may be water, jet during a cutting operation by dissipating the kinetic energy of the jet.

The choice of support material will, it will be understood, be affected (i) by the application of the worktable i.e. for use in the food industry hygiene considerations will require the use of specific grades of material and (ii) by the performance of the material with respect to creep, particularly lateral creep as the support material is maintained under tension. The support material may be a sheet material or a sheet material which is reinforced, for example by wire inserts to prevent creep. Crowned rollers may also be used in order to counteract this. Further, the support material could comprise a mesh, for example a wire, a plastics, or a plastics coated wire mesh. It could alternately comprise a plurality of parallel strands of for example wire, or it could comprise a laminate.

In a cutting machine having a slotted worktable of the kind associated with reference to the drawings, the cutting head could be numerically controlled. Thus X-Y co-ordinates of shapes to be cut could be fed into a computer.

The cutting head is, it will be understood, maintained between, preferably mid-way between, the edges of the slot, but the head is moveable relative to the slot in a direction parallel to the length of the slot. The term "roller" as used herein is intended generically to cover a smoothly surfaced cylindrical guiding element whether rotatable or non-rotatable.

I claim:

1. A slotted worktable, comprising, a first frame having two oppositely-facing sides, securing means disposed in a horizontal plane and arranged on said oppositely-facing sides of the first frame, a single length of flexible support material extending between said securing means, a second frame situated between said sides of the first frame and movable in a horizontal plane towards and away from said sides, a first pair of parallel rollers carried by the second frame and spaced apart in a horizontal plane substantially coplanar with said plane of the securing means, further roller means carried by the second frame and extending parallel to the first pair of rollers, below said plane of the first pair of rollers, the flexible support material being trained over the first pair of rollers and the further roller means so that said material passes over the first pair of rollers and below the further roller means to define a slot between the first pair of rollers.

2. A slotted worktable, according to claim 1, in which the further roller means comprise a second pair of horizontally spaced-apart rollers.

3. A slotted worktable, according to claim 2, in which the spacing between the rollers of the second pair is greater than the spacing between the rollers of the first pair.

4. A slotted worktable, according to claim 2, in which the flexible support material has a portion which is trained over the first pair of rollers and below the further roller means so as to define a slot which is symmetrical about a vertical plane passing midway between the first pair of rollers.

5. A slotted worktable, according to claim 1, in which the flexible support material has substantially coplanar portions extending between said securing means and the first pair of rollers, a receptacle is secured to the second frame within the slot defined by the flexible support material, and the receptacle has an open upper end which is substantially coplanar with said portions of the flexible support material.

6. A slotted worktable, according to claim 1, in which the single length of flexible support material has two free ends which are anchored by the securing means arranged on said oppositely-facing sides of the first frame.

7. A slotted worktable, according to claim 1, further comprising suction means for clamping a workpiece to the flexible support means.

8. Cutting apparatus, including a slotted worktable according to claim 1, in which cutting means are secured to the second frame, above the slot, to cut a workpiece positioned on the flexible support means.

9. Cutting apparatus, according to claim 8, in which the cutting means are movable relative to the second frame in a direction transverse to the direction of movement of the second frame towards and away from the sides of the first frame.

10. Cutting apparatus, according to claim 8, in which the cutting means comprise a high pressure fluid jet.

11. A worktable for holding a flat workpiece stationary as the same is operated upon by a movable penetrating tool arranged above the workpiece comprising, in combination, a single length of flexible material forming a wide belt having end portions extending horizontally in opposite directions as well as a central portion, a main frame having means for gripping the end portions of the length of material in tension to define a horizontal working plane upon which the workpiece is stationarily supported, first and second rollers spaced from one another and extending transversely of the length of material and tangent to the working plane, the central portion of the length of material being trained downwardly between the rollers to define a depending loop of material with the upper portion of the loop separated by a relatively narrow transversely extending clearance slot, auxiliary roller means at the lower end of the loop for keeping the loop in taut condition, a subframe, means for mounting the subframe for horizontal shifting movement parallel to the working plane, a penetrating tool support above the working plane, the penetrating tool support being mounted on the subframe so that the tool is centered with respect to the clearance slot, the first and second rollers and the auxiliary roller means being fixedly mounted with respect to the subframe so that upon shifting of the subframe to move the penetrating tool relative to the stationary workpiece the slot moves in unison with the tool to provide under-workpiece clearance for the tool regardless of the position of the tool on the workpiece, the subframe being shiftable through a sufficient distance so that the tool may traverse the belt throughout substantially its entire horizontal length thereby enabling accommodative support of a workpiece of substantially the same horizontal dimension as the belt.

12. The combination as claimed in claim 11, in which the auxiliary roller means comprises third and fourth rollers horizontally spaced apart by a distance greater than the spacing between the first and second rollers so that the loop is of trapezoidal section.

13. The combination as claimed in claim 11 in which the tool support is not only movable in unison with the subframe in the length dimension of the belt but is movable with respect to the subframe transversely of the belt so that the entire surface of the workpiece is accessible to the tool and with under-workpiece clearance being automatically provided regardless of the position of the tool on the workpiece.

* * * * *